United States Patent [19]

Lombardo

[11] Patent Number: 5,407,177
[45] Date of Patent: Apr. 18, 1995

[54] OIL VALVE DEVICES FOR REMOVING USED OIL FROM DRAIN PANS OF VEHICLES

[76] Inventor: Joseph A. Lombardo, 86 Front St., Freeport, N.Y. 11520

[21] Appl. No.: 204,952

[22] Filed: Mar. 2, 1994

[51] Int. Cl.$^6$ ............................................. F16K 15/06
[52] U.S. Cl. .................................. 251/315.14; 184/1.5
[58] Field of Search .................. 251/315 RC, 315 SE; 184/1.5

[56] References Cited

U.S. PATENT DOCUMENTS

| | | | |
|---|---|---|---|
| 2,606,738 | 8/1952 | Alen | 251/315 SE |
| 3,367,624 | 2/1968 | Scaramucci | 251/315 R C |
| 3,398,925 | 8/1968 | Scaramucci | 252/315 R C |
| 4,078,763 | 3/1978 | Yamamoto | 251/315 SE |

FOREIGN PATENT DOCUMENTS 1208254 10/1970 United Kingdom ......... 251/315 SE

*Primary Examiner*—John C. Fox

[57] ABSTRACT

An oil valve device for removing used oil from a drain pan of a vehicle comprising a cylindrical main body portion of a rigid material which has an input end and an output end and an axial bore extending centrally therethrough for conveying fluid through the main body portion from the input end to the output end. The bore is of a first diameter from the input end to an intermediate extent. The bore has an enlarged diameter from the intermediate extent to a location adjacent to the output end. The bore is of the largest diameter adjacent to the output end. The main body portion has a radial aperture therethrough in the intermediate extent. The main body portion has a threaded exterior on the exterior surface thereof at the input end and at the output end with a large hexagonal shaped nut removably couplable thereto. A housing has a cylindrical exterior surface positionable within the bore at its intermediate extent. The housing has a generally spherical interior surface with an opening extending therethrough in axial alignment with the bore. The housing also has a radial aperture positionable in alignment with the radial aperture of the main body portion. A generally spherical ball is positionable within the housing. The ball has an axial hole therethrough positionable in a first orientation with the hole in alignment with the bore for the passage of fluid therethrough and in a second orientation with the hole transverse thereto whereby the walls of the ball preclude the flow of fluid therethrough. The ball is of a reduced length at the ends of the hole and has a threaded aperture in one side thereof in alignment with the radial apertures. A retainer member is positionable in the bore adjacent to the housing on this side thereof opposite from the input end and adapted to hold the housing and ball in an operative orientation within the main body portion. A stem has an intermediate bend and an outboard end under the control of an operator and a linear inboard end with threads adapted to be releasably secured to the threaded aperture in the ball for turning the ball between an operative orientation and an inoperative orientation.

1 Claim, 4 Drawing Sheets

OIL VALVE DEVICES FOR REMOVING USED OIL FROM DRAIN PANS OF VEHICLES

BACKGROUND OF THE INVENTION

1. Field of the Invention

The present invention relates to new and improved oil valve devices for removing used oil from drain pans of vehicles and more particularly pertains to draining used oil from pans of automobiles through simplified mechanisms utilizing rotatable ball valves.

2. Description of the Prior Art

The use of valves of various types is known in the prior art. More specifically, valves of various types heretofore devised and utilized for the purpose of allowing the flow of fluids from containers through the use of a valve arrangement are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,874,478 to Mantell, Jr. discloses a crankcase drain valve with attachment for disposable oil bags.

U.S. Pat. No. 4,592,448 to Morris discloses an oil pan drain receptacle.

U.S. Pat. No. 4,940,209 to Fish discloses a levered fluid drain valve.

U.S. Pat. No. 4,986,777 to Preston discloses a marine engine oil drainage device.

Lastly, U.S. Pat. No. 5,074,379 to Batrice discloses an automotive oil change apparatus.

In this respect, the new and improved oil valve devices for removing used oil from drain pans of vehicles according to the present invention substantially departs from the conventional concepts and designs of the prior art, and in doing so provides an apparatus primarily developed for the purpose of draining used oil from pans of automobiles through a simplified mechanism utilizing rotatable ball valves.

Therefore, it can be appreciated that there exists a continuing need for new and improved oil valve devices for removing used oil from drain pans of vehicles which can be used for draining used oil from pans of automobiles through a simplified mechanism utilizing rotatable ball valves. In this regard, the present invention substantially fulfills this need.

SUMMARY OF THE INVENTION

In view of the foregoing disadvantages inherent in the known types of valves of various types now present in the prior art, the present invention provides new and improved oil valve devices for removing used oil from drain pans of vehicles. As such, the general purpose of the present invention, which will be described subsequently in greater detail, is to provide new and improved oil valve devices for removing used oil from drain pans of vehicles and method which has all the advantages of the prior art and none of the disadvantages.

To attain this, the present invention essentially comprises an oil valve device for removing used oil from a drain pan of a vehicle comprising a cylindrical main body portion of a rigid material which has an input end and an output end and an axial bore extending centrally therethrough for conveying fluid through the main body portion from the input end to the output end. The bore is of a first diameter from the input end to an intermediate extent. The bore has an enlarged diameter from the intermediate extent to a location adjacent to the output end. The bore is of the largest diameter adjacent to the output end. The main body portion has a radial aperture therethrough in the intermediate extent. The main body portion has a threaded exterior on the exterior surface thereof at the input end and at the output end with a large hexagonal shaped nut removably couplable thereto. A housing which has a cylindrical exterior surface positionable within the bore at its intermediate extent. The housing has a generally spherical interior surface with an opening extending therethrough in axial alignment with the bore. The housing also has a radial aperture positionable in alignment with the radial aperture of the main body portion. A generally spherical ball is positionable within the housing. The ball has an axial hole therethrough positionable in a first orientation with the hole in alignment with the bore for the passage of fluid therethrough and in a second orientation with the hole transverse thereto whereby the walls of the ball preclude the flow of fluid therethrough. The ball is of a reduced length at the ends of the hole and has a threaded aperture in one side thereof in alignment with the radial apertures. A retainer member is positionable in the bore adjacent to the housing on this side thereof opposite from the input end and adapted to hold the housing and ball in an operative orientation within the main body portion. A stem has an intermediate bend and an outboard end under the control of an operator and a linear inboard end with threads adapted to be releasably secured to the threaded aperture in the ball for turning the ball between an operative orientation and an inoperative orientation. An O-ring is supported within an annular recess in radial aperture of the main body portion to form a seal between the main body portion and the stem. A nut has a hexagonal exterior surface at the input end for effecting the coupling with a container for dispensing fluid to flow through the housing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved oil valve devices for removing used oil from drain pans of vehicles which have all the advantages of the prior art valves of various types and none of the disadvantages.

It is another object of the present invention to provide new and improved oil valve devices for removing used oil from drain pans of vehicles which may be easily and efficiently manufactured and marketed.

It is further object of the present invention to provide new and improved oil valve devices for removing used oil from drain pans of vehicles which are of durable and reliable constructions.

An even further object of the present invention is to provide new and improved oil valve devices for removing used oil from drain pans of vehicles which are susceptible of a low cost of manufacture with regard to both materials and labor, and which accordingly are then susceptible of low prices of sale to the consuming public, thereby making such new and improved oil valve devices for removing used oil from drain pans of vehicles economically available to the buying public.

Still yet another object of the present invention is to provide new and improved oil valve devices for removing used oil from drain pans of vehicles which provide in the apparatuses and methods of the prior art some of the advantages thereof, while simultaneously overcoming some of the disadvantages normally associated therewith.

Still another object of the present invention is to drain used oil from pans of automobiles through a simplified mechanism utilizing rotatable ball valves.

Lastly, it is an object of the present invention to provide a new and improved oil valve device for removing used oil from a drain pan of a vehicle comprising a cylindrical main body portion of a rigid material which has an input end and an output end and an axial bore extending centrally therethrough for conveying fluid through the main body portion from the input end to the output end. The bore is of a first diameter from the input end to an intermediate extent. The bore has an enlarged diameter from the intermediate extent to a location adjacent to the output end. The bore is of the largest diameter adjacent to the output end. The main body portion has a radial aperture therethrough in the intermediate extent. The main body portion has a threaded exterior on the exterior surface thereof at the input end and at the output end with a large hexagonal shaped nut removably couplable thereto. A housing has a cylindrical exterior surface positionable within the bore at its intermediate extent. The housing has a generally spherical interior surface with an opening extending therethrough in axial alignment with the bore. The housing also has a radial aperture positionable in alignment with the radial aperture of the main body portion.

A generally spherical ball is positionable within the housing. The ball has an axial hole therethrough positionable in a first orientation with the hole in alignment with the bore for the passage of fluid therethrough and in a second orientation with the hole transverse thereto whereby the walls of the ball preclude the flow of fluid therethrough. The ball is of a reduced length at the ends of the hole and has a threaded aperture in one side thereof in alignment with the radial apertures. A retainer member is positionable in the bore adjacent to the housing on this side thereof opposite from the input end and adapted to hold the housing and ball in an operative orientation within the main body portion. A stem has an intermediate bend and an outboard end under the control of an operator and a linear inboard end with threads adapted to be releasably secured to the threaded aperture in the ball for turning the ball between an operative orientation and an inoperative orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
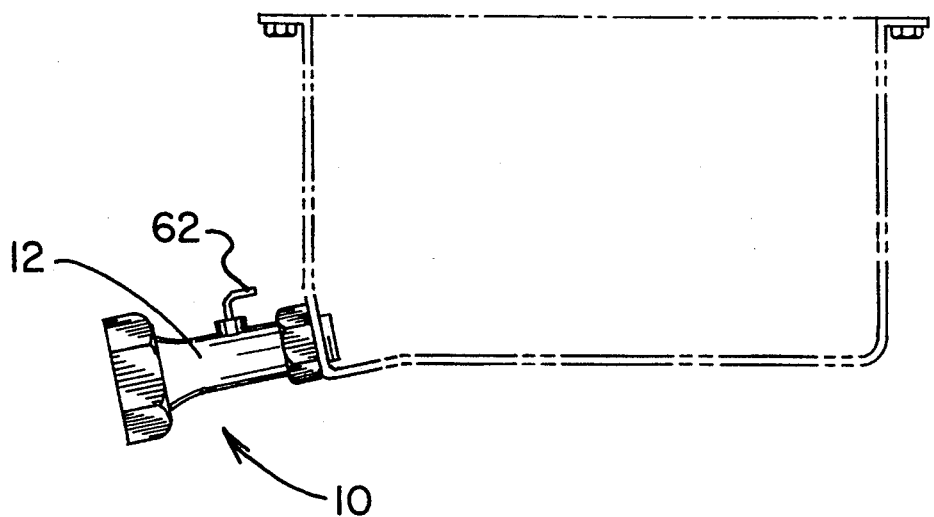
FIG. 1 is a side elevational view of the preferred embodiment of the new and improved oil valve devices for removing used oil from drain pans of vehicles constructed in accordance with the principles of the present invention.
Figure 2:
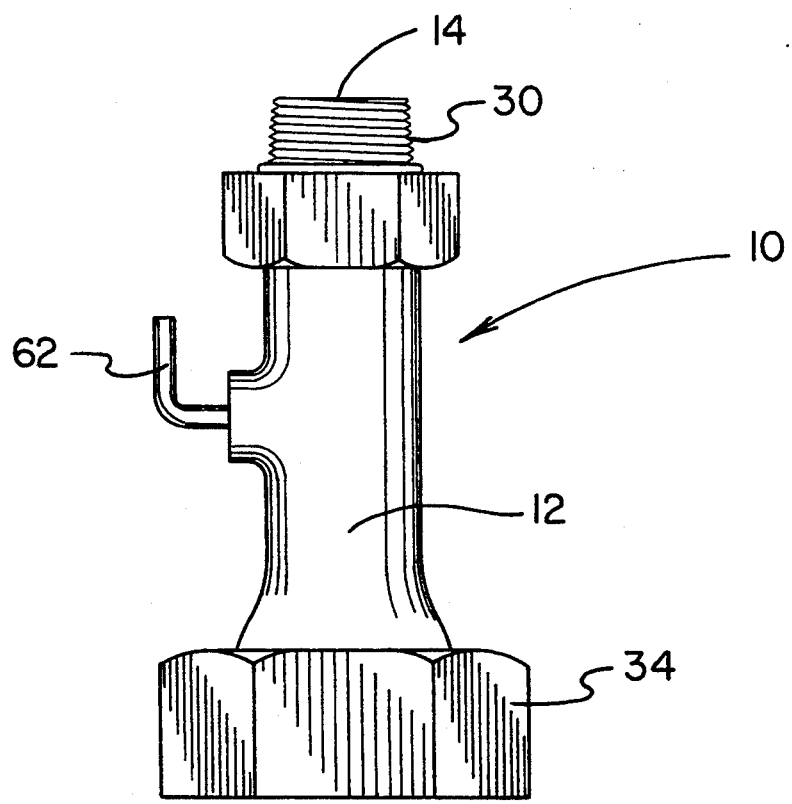
FIG. 2 is an enlarged side elevational view of the device of FIG. 1 but illustrated remote from the oil pan.
Figure 3:
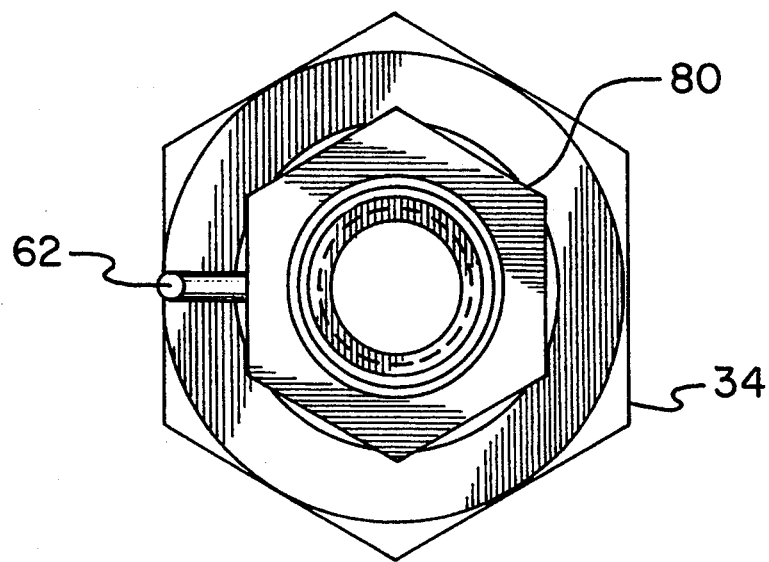
FIG. 3 is an enlarged top view of the device illustrated in FIGS. 1 and 2.
Figure 4:
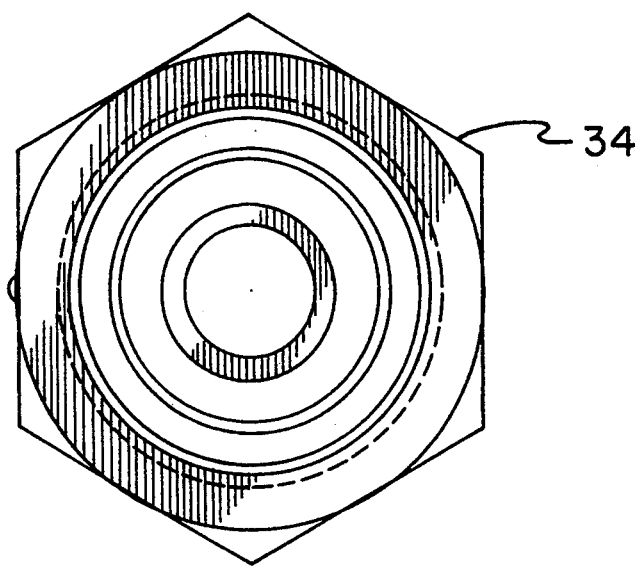
FIG. 4 is an enlarged bottom view of the device illustrated in FIGS. 1 and 2.
Figure 5:
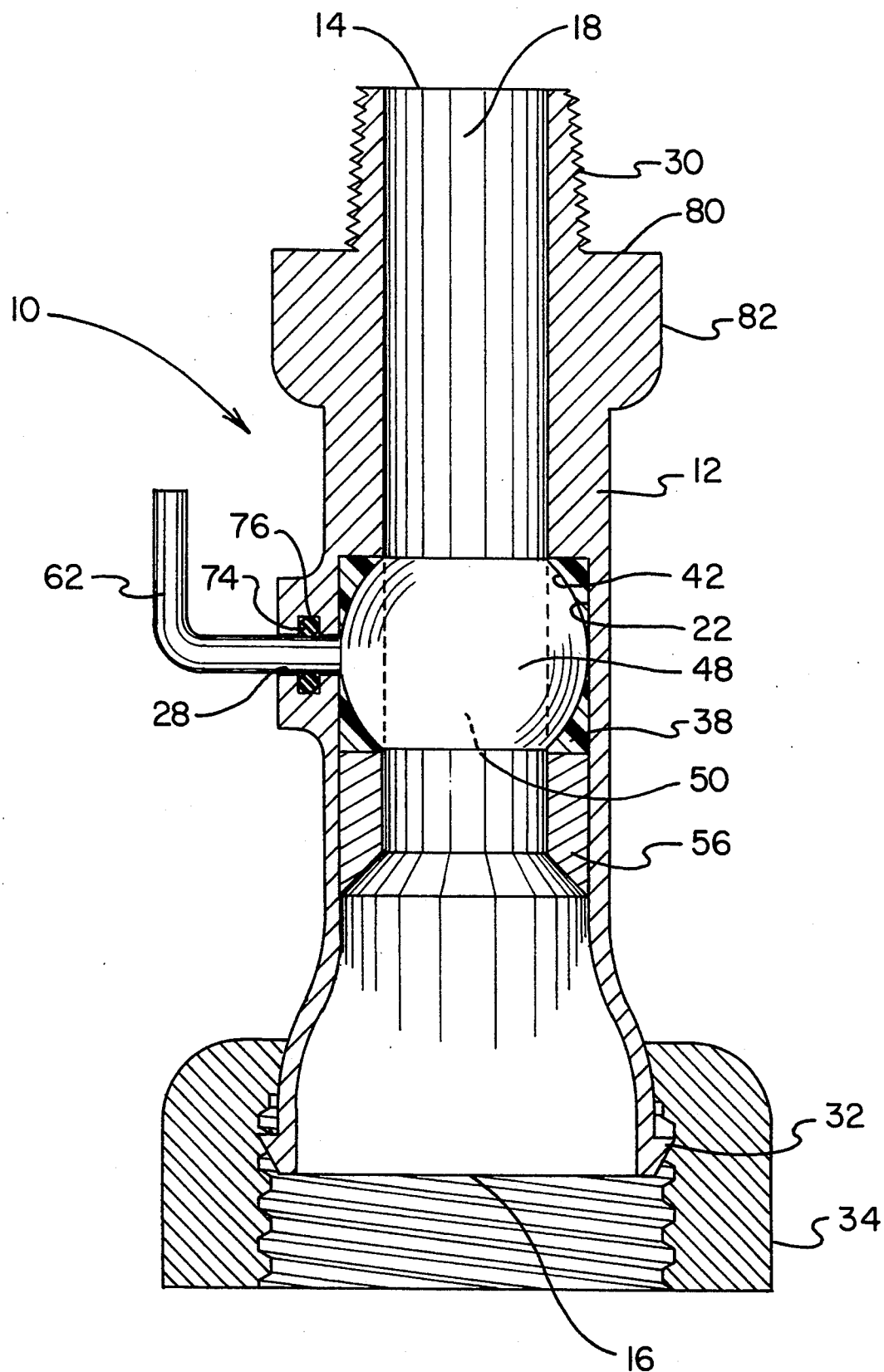
FIG. 5 is a cross sectional view of the device of the prior Figures taken longitudinally through the center line thereof.
Figure 6:
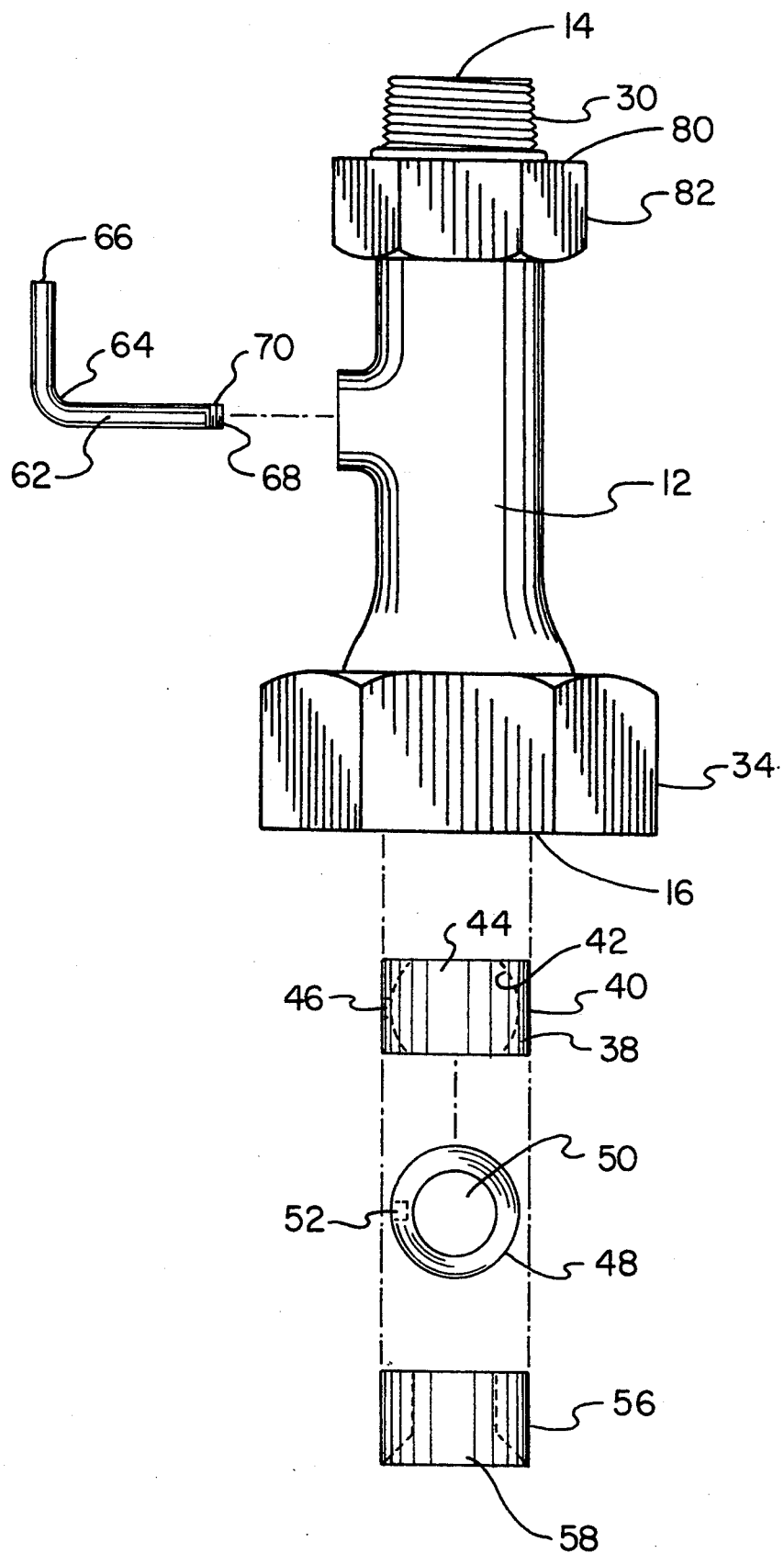
FIG. 6 is an exploded side elevational view of the device illustrated in the prior Figures.

With reference now to the drawings, and in particular to FIG. 1 thereof, the preferred embodiment of the new and improved oil valve devices for removing used oil from drain pans of vehicles embodying the principles and concepts of the present invention and generally designated by the reference numeral 10 will be described.

The present invention, the new and improved oil valve device for removing used oil from a drain pan of a vehicle is a system comprised of a plurality of components. In their broadest context such components include a main body portion, an elastomeric housing, a ball, a retainer member, a stem, an O-ring and a nut.

Such components are individually configured and correlated one with respect to the other to attain the desired objectives.

More specifically, the system 10 includes a cylindrical main body portion 12. The main body portion is of a rigid material, preferably copper although a rigid plastic such as PVC could be utilized for the main body portion. Such materials are also adapted for use throughout the system. The main body portion has an inboard end 14 and an output end 16. It also has an axial bore 18 extending centrally therethrough. The bore functions to convey fluid through the main body portion from the input end to the output end.

The bore has a first diameter from the input end to an intermediate extent 22. The bore end has an enlarged diameter from the intermediate extent to a location adjacent to the output end. The bore is of the largest diameter adjacent to the output end.

Also provided in the main body portion is a radial aperture 28. Such aperture extends through the wall of the main body portion in the intermediate extent. The main body portion also has a threaded exterior 30 on the exterior surface thereof at the input end. It also has a threaded exterior 32 at the output end with a large hexagonal shaped nut 34. Such threads and nuts are for coupling the main body portion to a container for collecting used oil drained from the drain pan of a vehicle or other source of used oil or other fluid to be moved through the main body portion.

The next component of the system is the elastomeric housing 38. The elastomeric housing has a cylindrical exterior surface 40 and is positionable within the bore at the intermediate extent. The housing has a generally spherical interior surface 42. Such interior surface is provided with an opening 44 extending therethrough in axial alignment with the bore. The housing also has a radial aperture 46 positionable in alignment with the radial aperture of the main body portion.

Positioned within the housing is a generally spherical shaped ball 48. The ball has an axial hole 50 therethrough. Such hole is positionable in a first or operative orientation wherein the hole is in alignment with the bore. This allows for the passage of fluid therethrough. The ball is also positionable in a second orientation with its hole transverse to its first orientation. In this manner, the walls of the ball preclude the flow of fluid through the main body portion and ball. The ball is of a reduced length at its ends by being cut to form the hole therethrough. The reduced length is effected through the ends of the hole. The ball is also provided with a threaded aperture 52 in one side thereof always in alignment with the radial apertures of the housing and main body portion.

The next major component of the device 10 is a retainer member 56. The retainer member is generally cylindrical exteriorly and is positionable in the bore adjacent to the housing on the side thereof opposite from the input end. It is adapted to fit into the intermediate extent and functions to hold the housing and ball in an operative orientation within the main body portion. The outboard end 58 of the retainer member is of a frustroconical shape to effect the smooth flow of fluid therethrough.

Movement of the ball between the operative and inoperative orientations is effected through a stem 62. The stem is a linear member with a bend 64 at an intermediate location. The outboard end 66 of the stem is under the control of an operator for turning the ball.

The inboard end 68 is linear with threads 70 at its inboard most extent. The stem is adapted to be releasably secured to the threaded aperture in the ball. In this manner, the ball may be turned between the operative orientation for allowing the flow of fluid therethrough and an inoperative orientation for stopping such flow.

Greater facility and efficiency is provided to the device 10 through an O-ring 74. Such O-ring is supported within an annular recess 76. Such annular recess is located in the radial aperture of the main body portion. The O-ring functions to form as seal between the main body portion and the stem.

The last component of the device 10 is a nut 80. The nut has a small hexagonal exterior surface 82 and is located adjacent to the input end. Such nut is for assisting in the holding and turning of the main body portion when the threads at the input end are coupled to the drain pan of the vehicle where the oil is to be removed.

The present invention is an innovative device that eliminates the mess associated with changing an automobile's oil. Anyone who has ever changed the oil knows that it is impossible to avoid spilling some of it. In addition, there is much mess associated with pouring the old oil into a suitable container. The present invention provides the means to quickly open the plug while directing the flow into a container for disposal.

This invention consists of two components. The first is a threaded device that replaces the original oil plug. This component can be manufactured in standard SAE and metric sizes. The threaded portion is made from brass, copper, or plastic. A rubber washer or O-ring fits around the base of the threads to prevent leaks. A safety latch controls the flow of oil. Normally, of course, the safety latch is kept in the closed position. The bottom portion is flared with a set of threads on the internal surface, into which is screwed the second component, a five quart container. This container is made from durable plastic and is suitable for transporting the used oil to a reclamation center.

To use the present invention, simply replace the standard oil plug with the new oil plug. When it is time to change the oil, attach the five quart container to the spout and open the safety latch. The oil will quickly fill the container, after which the latch is returned to the closed position. The container is then removed by unscrewing it, and the engine block is refilled with new oil.

The present invention is ideal for home use, but could be used commercially as well. It not only eliminates the mess associated with oil changes, but also minimizes the effort and time required to perform this operation. The present invention is simple in design and construction and may be made from readily available materials.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved oil valve device for removing used oil from a drain pan of a vehicle comprising, in combination:

a cylindrical main body portion of a rigid material having an input end and an output end and an axial bore extending centrally therethrough for conveying fluid through the main body portion from the input end to the output end, the bore being of a first diameter from the input end to an intermediate extent, the bore having an enlarged diameter from the intermediate extent to a location adjacent to the output end, the bore being of the largest diameter adjacent to the output end, the main body portion having a radial aperture therethrough in the intermediate extent, the main body portion having a threaded exterior at the input end and a large nut with a hexagonal exterior at the output end and removably couplable thereto;

a housing having a cylindrical exterior surface positionable within the bore at its intermediate extent, the housing having a generally spherical interior surface with an opening extending therethrough in axial alignment with the bore, the housing also having a radial aperture positionable in alignment with the radial aperture of the main body portion;

a generally spherical ball positionable within the housing, the ball having an axial hole therethrough positionable in a first orientation with the hole in alignment with the bore for the passage of fluid therethrough and in a second orientation with the hole transverse thereto whereby the walls of the ball preclude the flow of fluid therethrough, the ball being of a reduced length at the ends of the hole and having a threaded aperture in one side thereof in alignment with the radial apertures;

a retainer member positionable in the bore adjacent to the housing on this side thereof opposite from the input end and adapted to hold the housing and ball in an operative orientation within the main body portion;

an one-piece L-shaped stem having an intermediate bend and an outboard end under the control of an operator and a linear inboard end with threads adapted to be releasably secured to the threaded aperture in the ball for turning the ball between an operative orientation and an inoperative orientation;

an O-ring supported within an annular recess in 1 radial aperture formed in the main body portion to form a seal between the main body portion and the stem; and a nut having a hexagonal exterior surface at the input end coupling the main body portion to a drain pan of a vehicle for dispensing fluid to flow through the housing and out of the drain pan.

* * * * *